United States Patent
Butt et al.

(10) Patent No.: US 8,549,130 B2
(45) Date of Patent: Oct. 1, 2013

(54) DISCOVERY AND MANAGEMENT MECHANISM FOR SAN DEVICES

(75) Inventors: Kevin D. Butt, Tucson, AZ (US); Louie A. Dickens, Tucson, AZ (US); Olive P. Faries, Tucson, AZ (US); Laurence W. Holley, Tucson, AZ (US); Nancy V. Ryson, Tucson, AZ (US); Michael E. Starling, Tucson, AZ (US); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 12/962,856

(22) Filed: Dec. 8, 2010

(65) Prior Publication Data
US 2012/0151355 A1 Jun. 14, 2012

(51) Int. Cl.
*H04L 12/56* (2011.01)
(52) U.S. Cl.
USPC ............ 709/223; 709/238; 370/412; 370/401
(58) Field of Classification Search
None
See application file for complete search history.

(56) References Cited

U.S. PATENT DOCUMENTS

| | | | |
|---|---|---|---|
| 7,171,624 B2 | 1/2007 | Baldwin et al. | |
| 7,203,730 B1 | 4/2007 | Meyer et al. | |
| 7,633,955 B1 * | 12/2009 | Saraiya et al. | 370/401 |
| 7,685,261 B1 | 3/2010 | Marinelli et al. | |
| 2003/0149752 A1 | 8/2003 | Baldwin et al. | |
| 2003/0154271 A1 | 8/2003 | Baldwin et al. | |
| 2003/0208581 A1 | 11/2003 | Behren et al. | |
| 2005/0015657 A1 * | 1/2005 | Sugiura et al. | 714/6 |
| 2006/0215663 A1 | 9/2006 | Banerjee et al. | |
| 2006/0248047 A1 * | 11/2006 | Grier et al. | 707/2 |
| 2006/0271677 A1 | 11/2006 | Mercier | |
| 2007/0067435 A1 * | 3/2007 | Landis et al. | 709/224 |
| 2007/0088917 A1 * | 4/2007 | Ranaweera et al. | 711/148 |
| 2009/0222733 A1 | 9/2009 | Basham et al. | |
| 2009/0327902 A1 | 12/2009 | Bethune et al. | |

OTHER PUBLICATIONS

Kevin D. Butt et al., U.S. Appl. No. 12/845,625 entitled "Enhanced Zoning User Interface for Computing Environments," as filed on Jul. 28, 2010.

* cited by examiner

*Primary Examiner* — Hassan Phillips
*Assistant Examiner* — Omeed D Rahgozar
(74) *Attorney, Agent, or Firm* — Griffiths & Seaton PLLC

(57) ABSTRACT

Exemplary method, system, and computer program embodiments for managing a network are provided. In one embodiment, at least one of an available plurality of network components is polled, including devices, hosts and virtual devices, an interconnected plurality of communication paths, and quality of service (QoS) information in a discovery process for network information. A graphical representation of the at least one of the available plurality of network components is created for presentation by a graphical user interface (GUI) to a user. Based on a selection of the user of at least one attribute of the at least one of the available plurality of network components as displayed by the GUI to the user, a zone is created for the at least one of the available plurality of network components.

17 Claims, 4 Drawing Sheets

DISCOVERY AND MANAGEMENT MECHANISM FOR SAN DEVICES

BACKGROUND OF THE INVENTION

1. Field of the Invention

The present invention relates in general to computers, and more particularly to apparatus, method and computer program product embodiments for management of computing environments, such as data storage environments, using an enhanced user interface for performing device discovery and zone creation operations.

2. Description of the Related Art

Computers and computer systems are found in a variety of settings in today's society. Computing environments and networks may be found at home, at work, at school, in government, and in other settings. Computing environments increasingly store data in one or more storage environments, which in many cases are remote from the local interface presented to a user.

These computing storage environments may use many storage devices such as magnetic or optical disk drives, often working in concert, to store, retrieve, and update a large body of data, which may then be provided to a host computer requesting or sending the data. Solid-state disk drives may also be employed. In some cases, a number of data storage subsystems are collectively managed as a single data storage system. These subsystems may be managed by host "sysplex" (system complex) configurations that combine several processing units or clusters of processing units. In this way, multi-tiered/multi-system computing environments, often including a variety of types of storage devices, may be used to organize and process large quantities of data.

SUMMARY OF THE DESCRIBED EMBODIMENTS

Storage architectures, as previously mentioned, typically contain a wide variety of storage devices and interconnected components. Many of these devices are identifiable by worldwide name (WWN) information such as a port name or a node name (WWPN/WWNN). In Ethernet environments, these devices may be identified by MAC address. In conventional mechanisms for storage area network (SAN) management, the growing complexity and size of such storage environments has made processes, such as device discovery, difficult, as users are typically required to search through lists of information to discovery which particular device to use for a specific implementation.

In view of the foregoing, a need exists for a mechanism whereby management operations (such as device discovery operations) featuring such identifying characteristics of storage devices and interconnections may be performed in a more resource-efficient manner. Accordingly, exemplary method, system, and computer program embodiments for managing a computing network environment (such as a SAN) are provided. In one embodiment, by way of example only, at least one of an available plurality of network components is polled, including devices, hosts and virtual devices, an interconnected plurality of communication paths, and quality of service (QoS) information in a discovery process for network information. A graphical representation of the at least one of the available plurality of SAN components is created for presentation by a graphical user interface (GUI) to a user. Based on a selection of the user of at least one attribute of the at least one of the available plurality of network components as displayed by the GUI to the user, a zone is created for the at least one of the available plurality of network components.

In addition to the foregoing exemplary embodiment, various other method, apparatus, and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments provide mechanisms for a user to manipulate a graphical user interface to perform various Storage Area Network (SAN) management and configuration functions such as configuration and management of zones for the interconnected devices and communications paths typically seen in such architectures. The illustrated embodiments, for example, alleviate the necessity for manual search of device information such as worldwide port name (WWPN) and worldwide node name (WWNN) information for device discovery operations and automate management functions of the device information by performing such operations as elimination of duplicate device information. In addition, the illustrated embodiments allow for the visualization of such devices (and/or selection of such storage devices from a list of text), including such information, to the user, while allowing for the verification that management and configuration operations are correctly performed on a dynamic basis. This information may include device type, device model, device capacity, number of logical units the device is associated with, and if the device is using an associated security mechanism, for example. The mechanisms of the illustrated embodiments are operable in a variety of computing environments as will be understood by one of ordinary skill in the art, including environments incorporating WWPN and WWNN addressing as previously described, Ethernet, Gigabit Ethernet (GbEN), Internet Small Computer System Interface (iSCSI), Fibre Channel over Ethernet (FCoE), and Infiniband, for example.

The mechanisms of the illustrated embodiments provide for the discovery of devices based on a variety of SAN information, including WWPN, WWNN, specific path selection, and Quality of Service (QoS), in addition to discovery based on other characteristics as a device type, a device model, a device capacity, a number of logical units assigned to a particular device, and whether a security mechanism is associated with a particular device as will be further described. The discovery of these devices, presented to the user in graphical representation, is performed in a manner alleviating manual searching described previously and promoting efficiency and overall system performance. The graphical representation may be presented to the user using a graphical user interface (GUI), again as will be further described. The GUI may include any and all SAN information discovered for the particular device, such as the WWPN, WWNN, and other SAN information previously described.

In addition to the foregoing, the mechanisms of the illustrated embodiments facilitate the discovery of such various devices at off-peak times so as to conserve resource (e.g., bandwidth) consumption. These mechanisms may monitor the SAN periodically so as to keep information current and up to date. Again, in this way, duplicate information is eliminated and network performance is enhanced.

Figure 1:
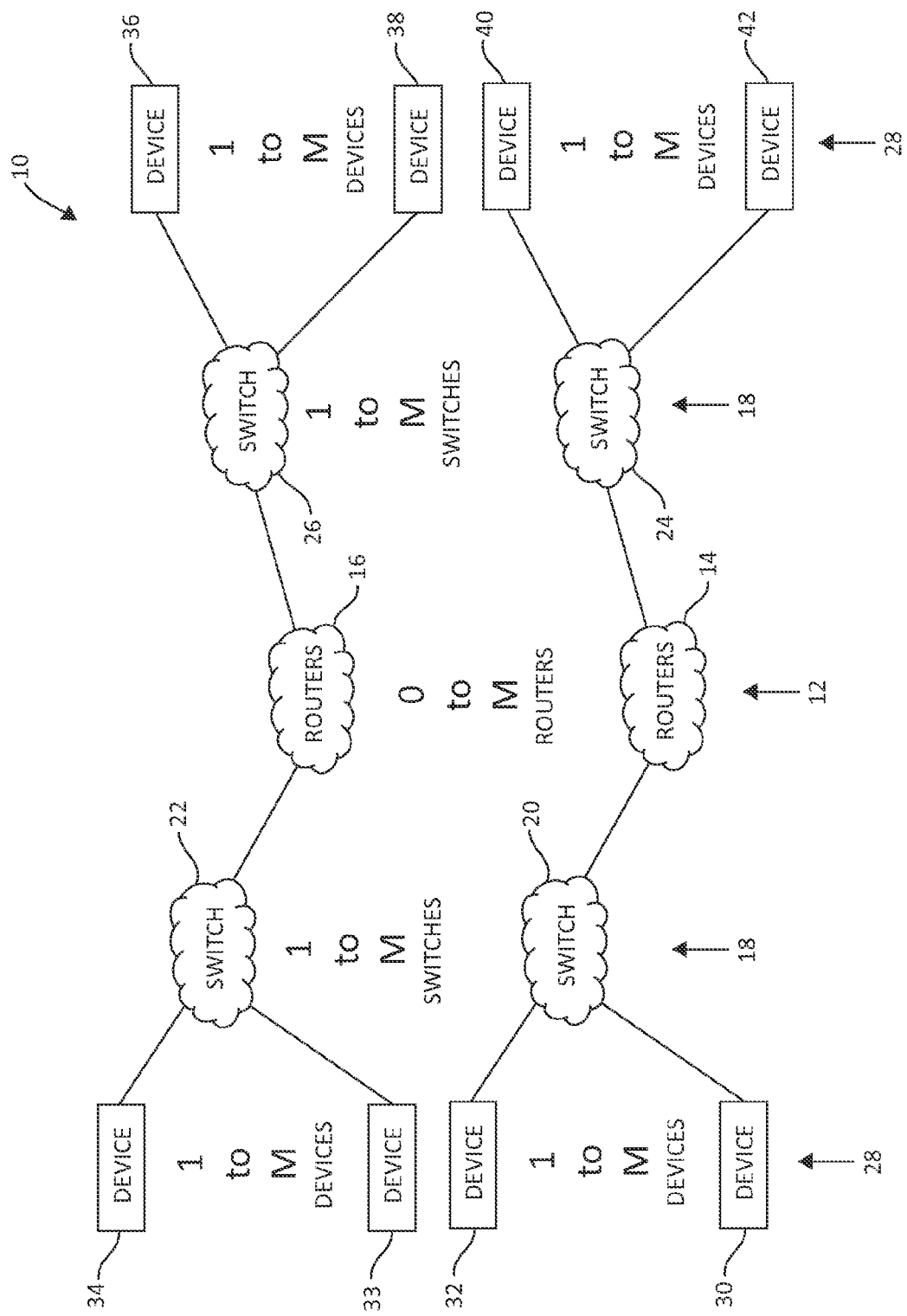
FIG. 1 is a block diagram of an exemplary storage area network (SAN) in accordance with certain embodiments.

Turning now to the drawings, reference is initially made to FIG. 1, which is a block diagram of an exemplary network 10, in accordance with a disclosed embodiment of the invention. The particular subsystem shown in FIG. 1 is presented to facilitate an explanation of the invention. However, as the skilled artisan will appreciate, the invention can be practiced using other computing environments, such as other storage subsystems with diverse architectures and capabilities such as various SAN architectures, meta storage networks, wide area networks (WANs), grid computing, cloud computing, and local area networks (LANs) operable in Ethernet environments.

Network 10 includes a number of components (labeled 0 or 1 to M to indicate that any number of such components is contemplated) interconnected as shown via various communication paths. A number of routers 12 are shown interconnected with switches 18 and devices 28 via various communication paths. For example, switch 24 is interconnected between router 14 and devices 40 and 42, while switch 20 is interconnected between router 14 and devices 30 and 32. Similarly, switch 22 is interconnected between router 16 and devices 33 and 34, while switch 26 is interconnected between router 16 and devices 36 and 38.

As one or ordinary skill in the art will appreciate, various components in the network 10 may be arranged in a storage area network (SAN), for example. The connecting paths between various components (such as between device 32 and switch 20) may include technologies such as Fibre Channel, Ethernet, or Fibre Channel over Ethernet. The network 10 may, for example, operate in or as, a network attached storage (NAS) or a storage subsystem in a SAN architecture.

As one of ordinary skill in the art will appreciate, a number of devices may be incorporated as devices 30, 32, 33, 34, 36, 38, 40, and 42. These may include, without limitation, storage devices such as hard disk drives, optical disk drives, solid state drives, Millipede nanotechnology drives, virtual devices such as thinly provisioned storage volumes, and other computing components such as processor or memory devices. Each device 30-42 may include additional processing and memory components in communication with other internal or external components connected over a respective data pathway. In one embodiment, a single device 42 may include a number of individual hard disk drive (HDD) devices in a redundant array of independent disks (RAID) configuration, including RAID-1 (mirroring), RAID-4 with single drive parity, and RAID-6 with parity on two drives. Routers 12 and switches 18 may be adapted as will be appreciated by one of ordinary skill in the art to perform switching and routing functionality, and otherwise provide interface functionality between one or more devices 30-42, for example. The communication links between routers 12, switches 18, and drives 28 includes copper cables, fibre-optical cables, and wireless communication links.

In another embodiment, one or more devices 30-42 may be host devices that are provided storage in response to an input/output (I/O) request, for example. As previously mentioned, the devices 30-42 may be processor devices, including microprocessor hardware as may be appreciated by one of ordinary skill in the art adapted to carry out various mechanisms of the illustrated embodiments as will be described below. For example, one device 42 may be adapted for collecting information for other devices 30-40, related communication paths, switches 18 and routers 12, including such information as WWNN and WWPN information for configuration purposes. In another embodiment, one device 42 may function as a graphical user interface (GUI) as presented on a display screen to a user, again as one of ordinary skill in the art will appreciate.

While not explicitly shown for purposes of illustrative simplicity, one of ordinary skill in the art will appreciate that in some embodiments, the devices 30-42 may be adapted for implementation in conjunction with certain hardware, such as a rack mount system, a midplane, and/or a backplane. Additional hardware such as the aforementioned switches, processors, controllers, memory devices, graphical user interfaces (GUI) and the like may also be incorporated into the devices 30-42 and elsewhere within the network 10, again as the skilled artisan will appreciate. Further, a variety of software components, operating systems, firmware, and the like may be integrated. For example, the devices 30-42 may include an initiator device for controlling a SAN, and include a processor device operable on the initiator device. Again, such variations would be understood by one of ordinary skill in the art.

The mechanisms of the illustrated embodiments, as will be further described, following, may use a variety of means to provide device discovery functionality. In one embodiment, management server un-zoned name server services maybe implemented to discover all the devices in a particular SAN, WAN, LAN, and meta storage. In an additional embodiment, a distributed name server database may be accessed and utilized to discover various devices in the SAN. For example, in one embodiment, port and process logins known as part of the fibre channel standard may be issued to every device in a particular SAN or meta SAN.

In another embodiment, the mechanisms of the present invention may issue commands to each device in the SAN for discovery purposes, such as report logical unit names (LUNs), inquiry, read capacity (e.g., for disk drives), report density (e.g, for tape devices), read capacity and read configuration (e.g., for media changer devices). The information discovered by each of the link services and commands may, in one embodiment, be stored in a database. Pursuant to such discovery and storage, duplicate information may be removed. In one embodiment, the mechanisms of the illustrated embodiments monitor for changes in a particular SAN or meta SAN through a state change notification process.

Many storage devices will only allow for discovery if the device's name is located in the device access list. To help facilitate discovery of various devices, the use of a well-known WWPN as will be further described may be implemented as will be further described to allow an associated device to issue or receive device discovery commands. In one example, a well known name of fffc21, where 21 is a domain id, and a well known WWPN of 5fffc2100000000 may be used, where 5 is a naming authority of the name as described in the fibre channel standard.

The mechanisms of the present invention, in one embodiment, employ discovery elements in the Fibre Channel standard and/or Small Computer System Interface (SCSI) standard to perform a discovery process, implement a graphical representation for presentation on a graphical user interface (GUI) of every device in an associated SAN/meta SAN, provide the user all possible information about a particular device through such GUI, where the GUI assists in performing zone creation as selected by the user (for example based on port selection by the user), and implements the use of a well known WWPN used for device discovery purposes.

Figure 2:
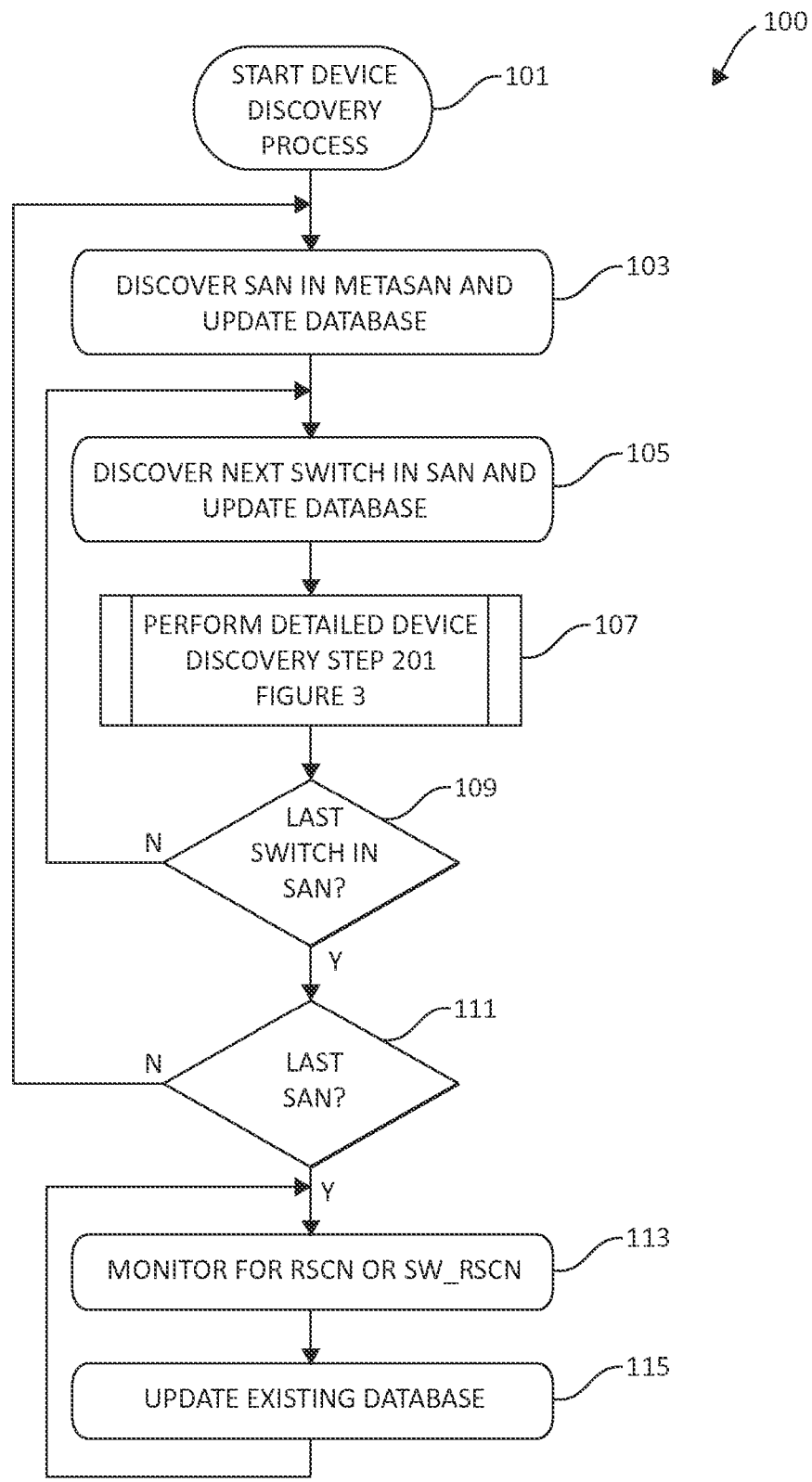
FIG. 2 is a flow chart diagram of an exemplary method for device discovery according to various aspects of the present invention.

Turning now to FIG. 2, an exemplary initial discovery process and database maintenance process (once initial discovery is complete) is illustrated, in which various aspects of the present invention and following claimed subject matter may be implemented. In one embodiment, elements of the method 100 may be performed, for example by processor devices incorporated as one or more devices 30-42 (FIG. 1). As part of start device discovery processing step 101, some initialization may be performed as known in the art of fibre channel. The particular initialization may depend on a particular discovery mechanism undertaken to discover the devices.

Figure 3:
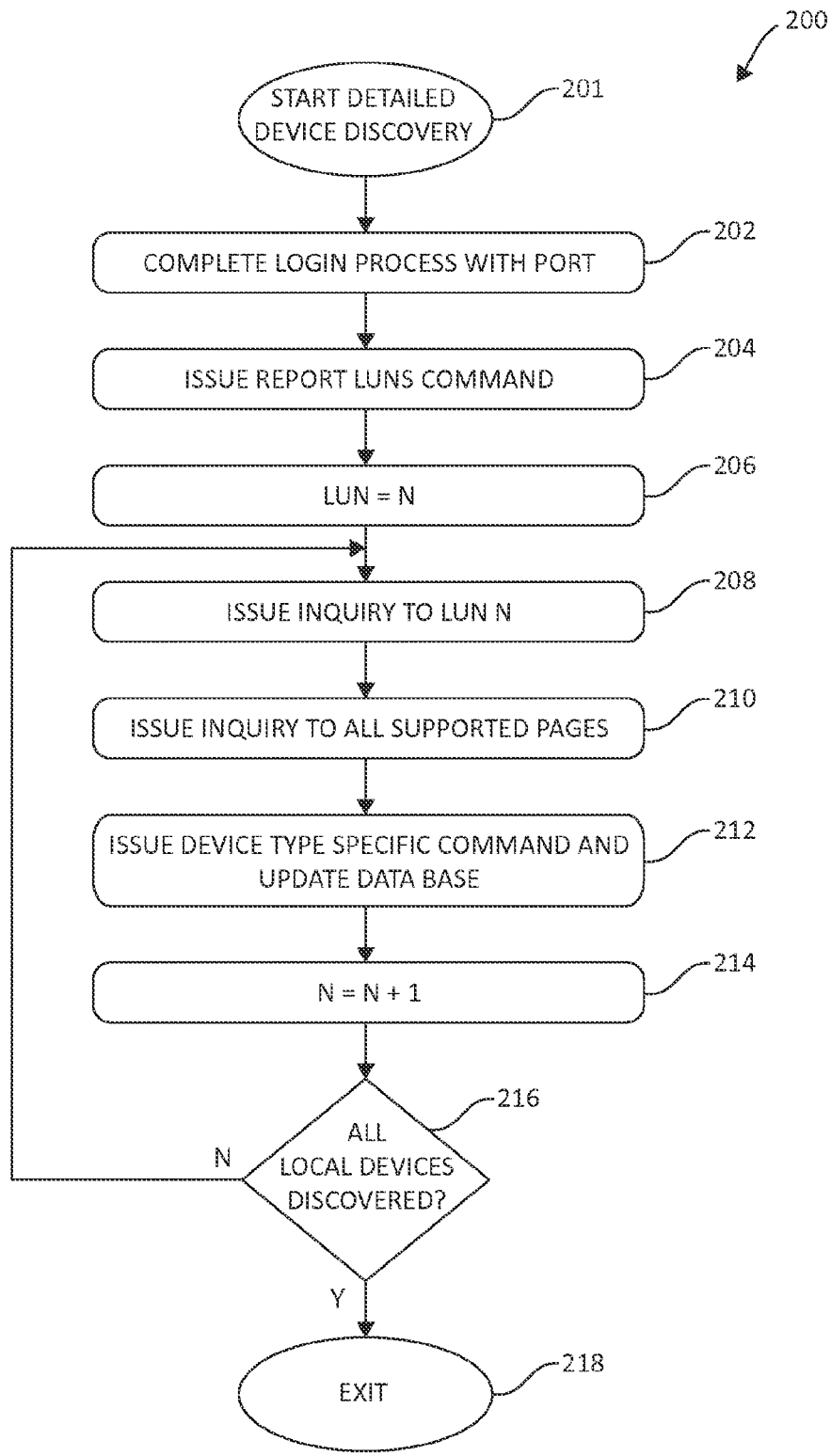
FIG. 3 is a flow chart diagram of an exemplary method for detailed device discovery according to various aspects of the present invention.

In discover step 103 each individual SAN in the MetaSan for the Enterprise is discovered. In discover step 105 a switch is discovered in the current SAN and information is added to the Database about this Switch. As part of this discovery process, duplicate switch information is removed. In discover step 107, a detailed device discovery in the current switch is performed. A more detailed examination of the discovery process is illustrated in FIG. 3, following. In step 109, a check is made to determine if this is the last switch in the current SAN. If not, the next switch will be discovered in step 105. If it is the last switch in the current SAN, a check will be made in step 111 to determine if this is the last SAN in the MetaSan. If this is not the last SAN in the MetaSan, the method 100 proceeds to step 103 to discover the next SAN in the MetaSan and add information to (or eliminate duplicate information from) the Database about this SAN.

After all SANs in the MetaSan are discovered, all switches in each SAN that are part of the MetaSan are discovered, and each switch and its connected devices are discovered. In Step 113, a monitoring of Registered State Change Notification (RSCN), and switch-specific RSCN (SW_RSCN) takes place to determine if any component of the SAN has changed (e.g., addition, deletion, or modification). In Step 115, the existing SAN database is updated. Here again, any duplicate SAN information in the database will be removed. This process described in steps 113 and 115, in one embodiment, is an asynchronous process that is always occurring. The process described in steps 113 and 115 is in effect, and functioning while steps 101 through steps 111 are occurring so that the device database always reflects the current state of the MetaSAN.

Turning to FIG. 3, method 200 shows an exemplary detailed device discovery process as previously mentioned. Method 200 begins (step 201, and again as an extension of the exemplary discovery process began in FIG. 2, previously), by completing a particular SCSI or fibre channel login process (step 202). A report LUNs command is issued (step 204), where each LUN is equal to variable N (step 206). For each LUN N, an inquiry is issued (step 208) as well as all supported pages (step 210). As an additional step, a device type specific command is issued (step 212), and the SAN database is updated with information about the device (including removal of duplicate SAN information), and the N variable is incremented (step 214). If it is determined that the detailed discovery process should continue, the method 200 returns to step 208. Once all logical devices are discovered (step 216), this section exits (step 218), by returning control back to step 109 in FIG. 2, previously.

Figure 4:
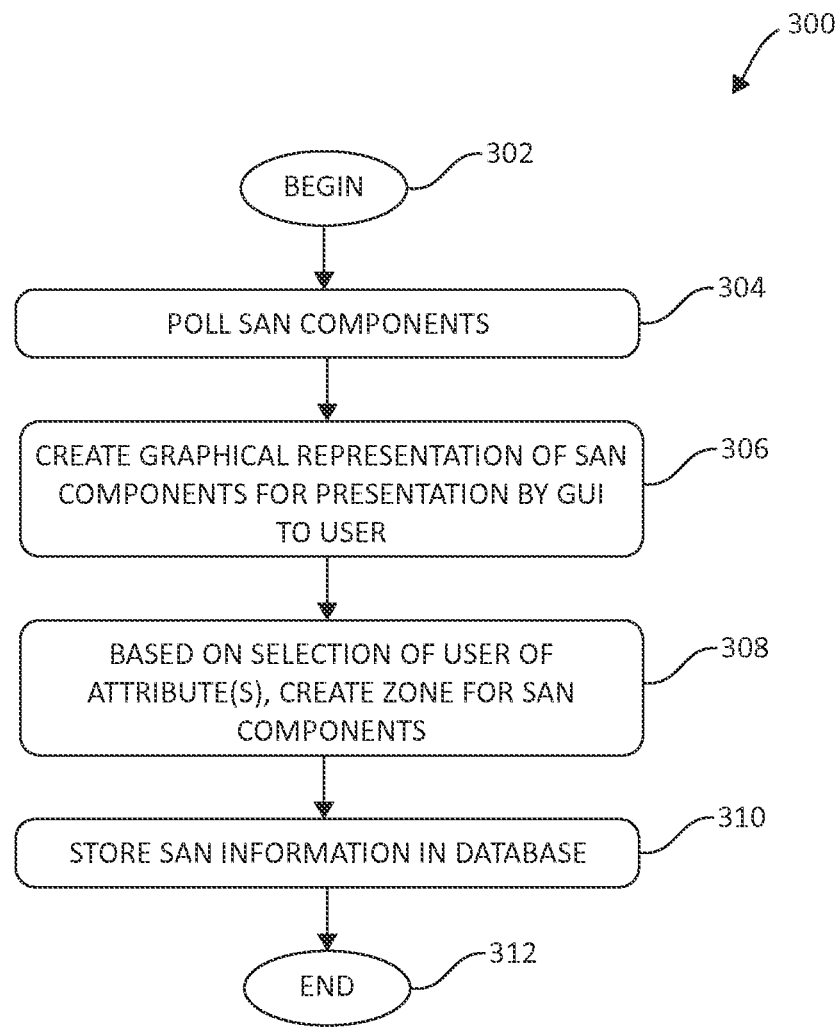
FIG. 4 is a flow chart diagram of an exemplary method for management of a SAN according to various aspects of the present invention.

Turning now to FIG. 4, an exemplary method 300 is illustrated for performing the discovery functionality previously illustrated as presented to a user in graphical form. The present exemplary method 300 is provided for employment in storage area networks (SANs), however one of ordinary skill in the art will appreciate that any network, such as but not limited to a storage area network (SAN), meta-storage network, wide area network (WAN), local area network (LAN), grid computing network, and cloud computing network may incorporate various aspects of the present invention and following claimed subject matter.

Method 300 begins (step 302) with the polling of SAN components for various information (step 304). As previously described, the SAN components may include devices, hosts and virtual devices, an interconnected plurality of communication paths, and quality of service (QoS) information. The SAN components are polled in one or more discovery processes (e.g., those described in FIGS. 2 and 3) for SAN information. The SAN information may, in one embodiment, include information such as worldwide port name (WWPN), worldwide node name (WWNN), a specific path of the interconnected plurality of communication paths, the QoS information, a device type, a device model, a device capacity, a number of logical units associated with the at least one of the plurality of devices, and a security mechanism, for example.

Based on the SAN information, a graphical representation of the SAN components is created for presentation by GUI to a user (step 306). Based on the selection of a user of various attributes of the SAN components, one or more zones of the SAN components are then created (step 308). The SAN information is then stored/updated in a database (including additions of new SAN information, modifications of existing SAN information, and removals of SAN information no longer representative of the SAN), while duplicate SAN information is removed (step 310). The method 300 then ends (step 312).

As previously mentioned, a number of discovery mechanisms may be implemented to perform the discovery process. These may include analyzing management server unzoned name server services for the SAN information, or querying a distributed name server database for the SAN information. In addition, pursuant to the device discovery process (such as previous to the polling process previously described in FIG. 4), a well known WWPN may be assigned to one or more of the SAN components for the purpose of issuing and/or receiving discovery commands, again as previously mentioned.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), a DVD read-only memory (DVD-ROM), a Blu-Ray read-only memory (BD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for organizing a network using a processor device, comprising:
providing a plurality of available network components, the plurality of available network components including devices, hosts and virtual devices, an interconnected plurality of communication paths, and quality of service (QoS) information, wherein a first group of the network components is included on a device access list and a second group of the network components is omitted from the device access list;
after providing the plurality of network components, searching with a domain ID and a naming authority of a predetermined WWPN designated by Fibre Channel standard (FC) to identify the network components omitted from the device access list;
after searching with the domain ID and the naming authority to identify the network components omitted from the device access list, polling the identified network components to obtain information relating to the identified network components using discovery elements in a Fibre Channel (FC) standard and a Small Computer System Interface (SCSI) standard to obtain network information and device characteristic information relating to each component without manual searching, the network information including at least one of a worldwide node name (WWNN), a specific path of the interconnected plurality of communication paths, and the QoS information, and the device characteristic information including a device type, a device model, a device capacity, a number of logical units associated with the at least one of the plurality of devices, and a security mechanism;
after polling the identified network components, creating a graphical representation of the available plurality of network components for presentation by a graphical user interface (GUI) to a user; and
based on a selection of the user of at least one attribute of the available plurality of network components as displayed by the GUI to the user and after creating the graphical representation, creating a zone for at least one of the available plurality of network components.

2. The method of claim 1, wherein:
the network includes at least one of a storage area network (SAN), meta-storage network, wide area network (WAN), local area network (LAN), grid computing network, and cloud computing network,
at least one of the available plurality of network components is a switch device, and
the discovery process includes analyzing management server unzoned name server services for the network information.

3. The method of claim 1, wherein:
the network includes at least one of a storage area network (SAN), meta-storage network, wide area network (WAN), local area network (LAN), grid computing network, and cloud computing network,
at least one of the available plurality of network components is a switch device, and
the discovery process includes querying a distributed name server database for the network information.

4. The method of claim 1, further including, pursuant to the discovery process, updating a database inclusive of the network information to perform at least one of adding network information to the database, modifying existing network information, deleting network information no longer representative of the network, and removing duplicate network information from the database.

5. The method of claim 1, wherein the predetermined WWPN allows the at least one of the available plurality of network components to perform at least one of respond to and issue a device discovery command.

6. A system for organizing a network, comprising:
a processor operational in the network, wherein the network includes a plurality of available network components, the plurality of available network components including devices, hosts and virtual devices, an interconnected plurality of communication paths, and quality of service (QoS) information, wherein a first group of the network components is included on a device access list and a second group of the network components is omitted from the device access list, and the processor is adapted for:
searching with a domain ID and a naming authority of a predetermined WWPN designated by Fibre Channel standard (FC) to identify the network components omitted from the device access list,
after searching with the domain ID and the naming authority to identify the network components omitted from the device access list, polling the identified network components to obtain information relating to the identified network components using discovery elements in a Fibre Channel (FC) standard and a Small Computer System Interface (SCSI) standard to obtain network information and device characteristic information relating to each component without manual searching, the network information including at least one of a worldwide node name (WWNN), a specific path of the interconnected plurality of communication paths, and the QoS information, and the device characteristic information including a device type, a device model, a device capacity, a number of logical units associated with the at least one of the plurality of devices, and a security mechanism,
creating a graphical representation of the available plurality of network components for presentation by a graphical user interface (GUI) to a user, and
based on a selection of the user of at least one attribute of the available plurality of network components as displayed by the GUI to the user, creating a zone for at least one of the available plurality of network components.

7. The system of claim 6, wherein:
the network includes at least one of a storage area network (SAN), meta-storage network, wide area network (WAN), local area network (LAN), grid computing network, and cloud computing network,
at least one of the available plurality of network components is a switch device, and
the processor is further adapted for, pursuant to the discovery process, analyzing management server unzoned name server services for the network information.

8. The system of claim 6, wherein:
the network includes at least one of a storage area network (SAN), meta-storage network, wide area network (WAN), local area network (LAN), grid computing network, and cloud computing network,
at least one of the available plurality of network components is a switch device, and
the processor is further adapted for, pursuant to the discovery process, querying a distributed name server database for the network information.

9. The system of claim 6, wherein:
the network includes at least one of a storage area network (SAN), meta-storage network, wide area network (WAN), local area network (LAN), grid computing network,
at least one of the available plurality of network components is a switch device, and
the processor is further adapted for, pursuant to the discovery process, updating a database inclusive of the network information to perform at least one of adding network information to the database, modifying existing network information, deleting network information no longer representative of the network, and removing duplicate network information from the database.

10. The system of claim 6, wherein the predetermined WWPN allows the at least one of the available plurality of network components to perform at least one of respond to and issue a device discovery command.

11. The system of claim 6, wherein at least one of the available plurality of network components is an initiator device, and the processor is operable on the initiator device.

12. The system of claim 6, wherein the processor is a storage management processor (SMP).

13. A computer program product for managing a network using a processor device, the network including a plurality of available network components, the plurality of available network components including devices hosts and virtual devices, an interconnected plurality of communication paths, and quality of service (QoS) information wherein a first group of the network components is included on a device access list and a second group of the network components is omitted from the device access list, the computer program product comprising a computer-readable storage device having computer-readable program code portions stored therein, the computer-readable program code portions comprising:
a first executable portion for searching with a domain ID and a naming authority of a predetermined WWPN designated by Fibre Channel standard (FC) to identify the network components omitted from the device access list,
a second executable portion for, after searching with the domain ID and the naming authority to identify the network components omitted from the device access list, polling the identified network components to obtain information relating to the identified network components using discovery elements in a Fibre Channel (FC) standard and a Small Computer System Interface (SCSI) standard to obtain network information and device characteristic information relating to each component without manual searching, the network information including at least one of a worldwide node name (WWNN), a specific path of the interconnected plurality of communication paths, and the QoS information, and the device characteristic information including a device type, a device model, a device capacity, a number of logical units associated with the at least one of the plurality of devices, and a security mechanism;

a third executable portion for creating a graphical representation of the available plurality of network components for presentation by a graphical user interface (GUI) to a user; and a fourth executable portion for, based on a selection of the user of at least one attribute of the available plurality of network components as displayed by the GUI to the user, creating a zone for the at least one of the available plurality of network components.

14. The computer program product of claim 13, wherein:
the network includes at least one of a storage area network (SAN), meta-storage network, wide area network (WAN), local area network (LAN), grid computing network, and cloud computing network, at least one of the available plurality of network components is a switch device, and further including a fifth executable portion for, pursuant to the discovery process, analyzing management server unzoned name server services for the network information.

15. The computer program product of claim 13, wherein:
the network includes at least one of a storage area network (SAN), meta-storage network, wide area network (WAN), local area network (LAN), grid computing network, and cloud computing network, at least one of the available plurality of network components is a switch device, and further including a fifth executable portion for, pursuant to the discovery process, querying a distributed name server database for the network information.

16. The computer program product of claim 13, further including a fifth executable portion for, pursuant to the discovery process, updating a database inclusive of the network information to perform at least one of adding network information to the database, modifying existing network information, deleting network information no longer representative of the network, and removing duplicate network information from the database.

17. The computer program product of claim 13, wherein the predetermined WWPN allows the at least one of the available plurality of network components to perform at least one of respond to and issue a device discovery command.

* * * * *